May 1, 1928. 1,668,118
J. B. MAYONE
BRICK PALLET SETTING INSTALLATION
Filed Aug. 3, 1927 2 Sheets-Sheet 2
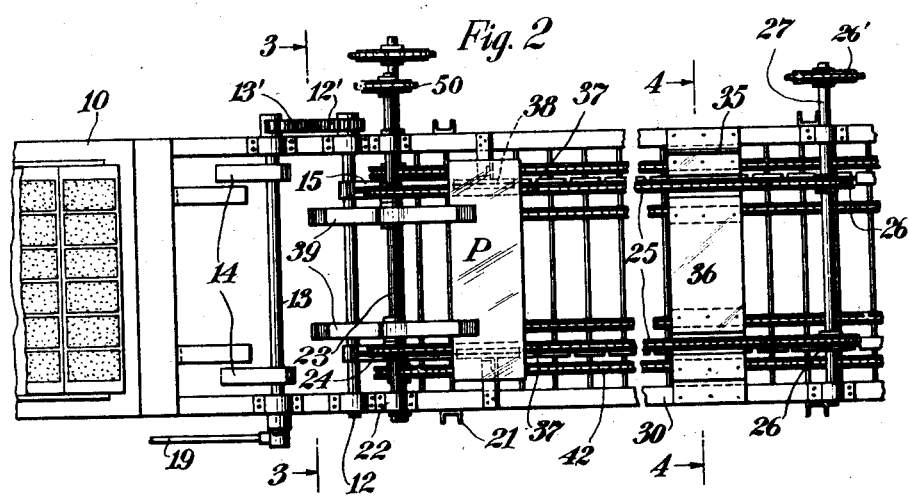
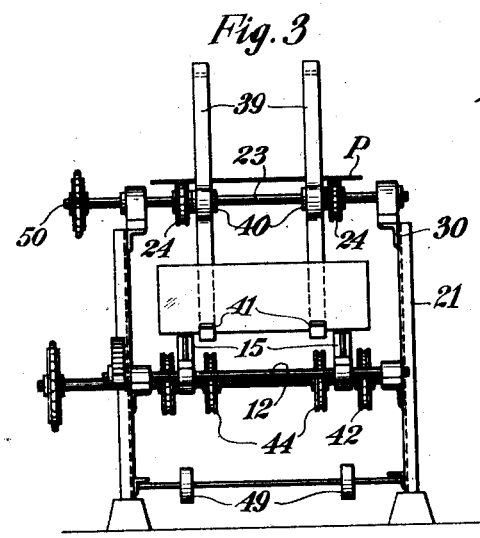
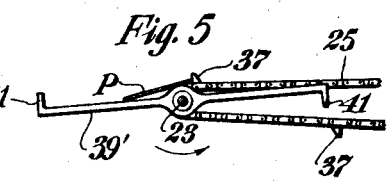
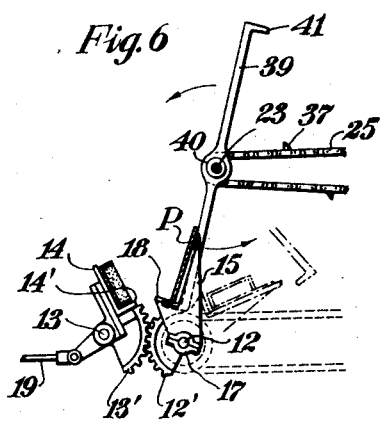
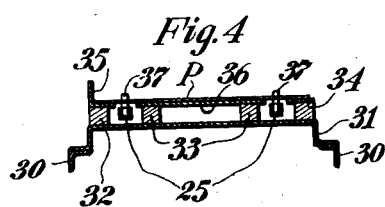
INVENTOR
*John B. Mayone,*
BY
*Dean, Fairbank, Obrieght & Hirsch*
his ATTORNEYS.

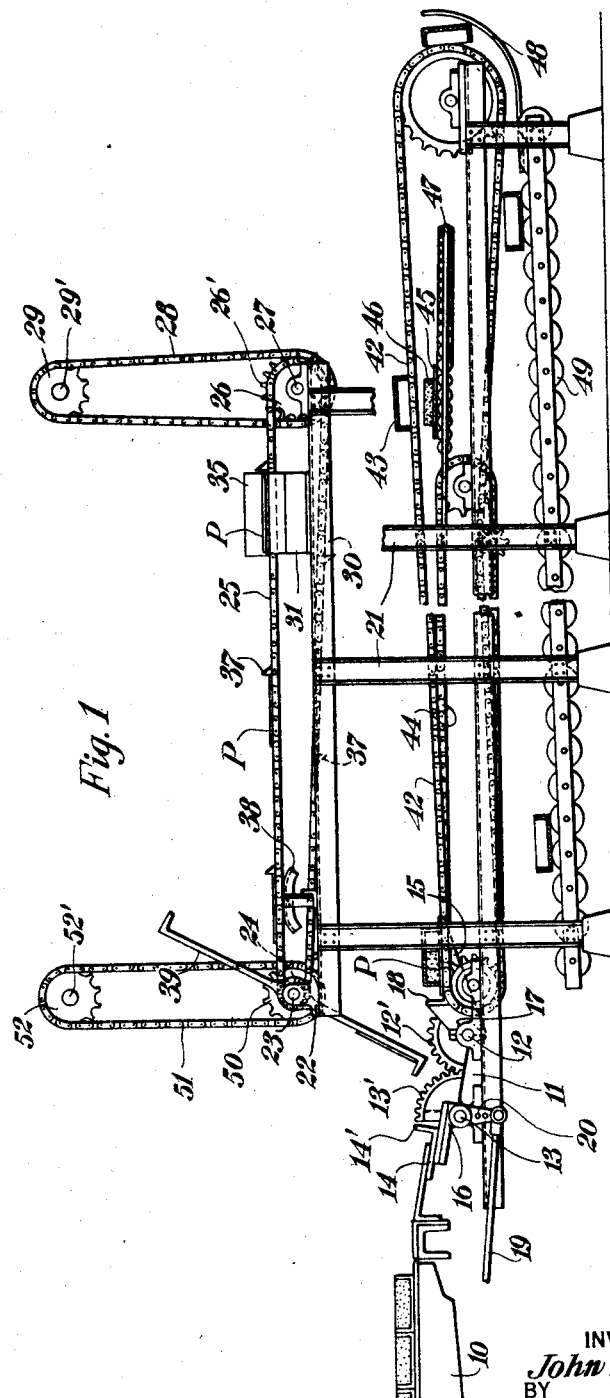

Patented May 1, 1928.

1,668,118

UNITED STATES PATENT OFFICE.

JOHN B. MAYONE, OF SAUGERTIES, NEW YORK, ASSIGNOR TO MAYONE BRICK CO. INC., A CORPORATION OF NEW YORK.

BRICK-PALLET-SETTING INSTALLATION.

Application filed August 3, 1927. Serial No. 210,286.

My present invention is concerned primarily with brick making machinery and relates more especially to apparatus and methods for delivering the pallets to the inverter.

Positioning the pallet by hand is an operation requiring some degree of dexterity, inasmuch as the pallet must be accurately placed on the pallet rest, during the small intervals between the rapidly executed mold inverting operations. Such manual pallet setting ordinarily necessitates the services of at least two employees, one of whom hands the pallets to the other who, in turn, positions them on the inverter.

It is an object of the invention to provide mechanism of simple and reliable character, to which the pallets may be fed by an unskilled man or boy and in the operation of which the pallets are automatically and accurately positioned at the inverter.

It is another object to provide pallet setting means of the above type, of rugged and simple construction, which lends itself readily for application to machines having inverters and dumpers of approved construction, without necessitating any modifications thereof, without in any way hampering or impeding the normal operation of such machines and without danger of upsetting, misplacing or shifting the pallet, yet dispensing with any complications such as trip locks or latches for retaining the pallet in place.

According to the present invention, the successive pallets are automatically associated with the pallet rest of the ordinary mold inverter, preferably by causing said rest in its regular advance toward the mold to pick up the pallets from a feeder which automatically positions the same. The feeder in a desirable embodiment operates as a gravity chute to direct the pallet downward to the path of movement of the pallet rest, as the latter approaches the mold. The chute is preferably movable so as to avoid obstruction to the opening or return movement of the pallet rest with its load of pallet and mold.

A horizontal chain conveyor advances the pallets from a platform upon which they are laid by hand and delivers them to the chute. The movable chute may comprise a pair of parallel feeder arms affixed upon a horizontal continuously revolving shaft, preferably the shaft that mounts the sprocket wheels at the outlet end of the conveyor chain. The parts are so timed that the pallet on the feeder arm chute extends downward into the path of the pallet rest, during the operating or closing stroke of the latter, and out of the path of the return or opening of the inverter. Preferably, the chute fingers comprise arms, through the middles of which the shaft extends, so that each end of these arms serves as a chute, one pallet being delivered for each half revolution of the shaft carrying the chute arms.

In the accompanying drawings in which is shown one of various possible embodiments of the several features of the invention Fig. 1 is a diagrammatic side elevation of the mechanism with parts broken away, Fig. 2 is a plan view thereof, Fig. 3 is an end view thereof, Fig. 4 is a detailed sectional view taken on line 4—4 of Fig. 2, Fig. 5 is a diagrammatic view indicating one stage of the operation of the pallet setting conveyor, and Fig. 6 is a diagrammatic view indicating the pallet transfer operation.

Referring now to the drawings, I have indicated the delivery end of a brick molding machine including the table 10 and the mold inverting mechanism 11. Since this latter mechanism which in itself is old and well known, enters into a novel combination as herein claimed, with other elements of my invention, it will be here briefly described.

The inverter comprises a pair of rock shafts 12 and 13 intermeshed by sector gears 12' and 13' rigidly affixed to the respective shafts. The shaft 13 which is at level somewhat higher than shaft 12 has rigidly keyed thereto the hubs 16 of a pair of arms 14 affording a flat rest and having stop fingers 14' for arresting the filled molds, as these are successively pushed upon the rest from the table 10. The shaft 12 has mounted thereon, a pallet rest including a pair of parallel arms 15, each supported upon a corresponding hub 17, which is rigidly affixed upon shaft 12. The hub 17 affords a shoulder 18 for positioning the pallet P, laid on arms 15. The pallet is of length considerably greater than the distance between arms 15 and its ends project well therebeyond. The inverter is operated by means of a pitman 19 driven from the brick molding machine and hinged to an arm 20 rigid with the shaft 13. A pallet being previously laid upon the fingers 15 and a filled mold upon the fingers 14, the machine in its operation will cause the mold to oscillate upward about the axis of shaft 13, and simultaneously to bring the pallet to upward position. While the pallet rest arms are substantially vertical, the mold is transferred onto the pallet, whereupon in the return movement of the oscillating pitman, the now loaded pallet rest arms 15 and the mold rest arms 14 return to their original open position shown in Fig. 1.

According to the present invention, the pallets are automatically or mechanically deposited or positioned upon the pallet rest arms 15, for which purpose I provide a novel mechanism now to be described.

The pallet setting device includes a pair of lateral frames 21 built up of angle bars, and upon which are mounted bearing blocks 22 for a shaft 23 upon which shaft, are idler sprocket wheels 24 over which extend a pair of parallel endless sprocket conveyor chains 25 driven from a corresponding pair of larger sprocket wheels 26 fixed on a driving shaft 27. The latter has a driving sprocket 26' driven by means of a chain 28 from a sprocket wheel 29 on a driving shaft 29', which, in turn, is preferably driven from the same source of power which operates the mechanism in its entirety.

The mechanism is provided with a pair of angle bars 30 at opposite sides of the chains upon which are affixed the ends of a fixed bridge piece 31 extending immediately under the upper runs of the chains 25. Upon the bridge piece are mounted cleats 32, 33 and 34, which extend slightly above the chains. The outer cleat has an angle bar 35 thereon, serving as a stop for the pallet P which is simply laid by hand upon the platform formed by said cleats until its end contacts the stop 35. Preferably a sheet 36 overlies the cleats to prevent catching the end of a pallet between two of the cleats.

The chains are provided with lugs 37 extending upward from between the cleats to engage the trailing edge of the pallet P so that as pallets are successively placed upon the platform 36, the conveyor chain in its continuous operation will advance these pallets therealong at the fixed intervals between successive stop lugs 37. Preferably the outer part of the chain is sustained against sagging by resting its upper run upon a support bridge piece 38 connected between the frames 21.

The conveyor chain delivers to a pallet feeder, preferably a movable chute of the specific construction now to be described.

Upon the shaft 23 at the outlet end of the conveyor, I mount a pair of double-ended arms 39 having hubs 40 at their middles rigidly affixed or clamped upon the shaft 23, so as to revolve therewith. Each end of the arm has an outstanding stop finger 41 directed toward the trailing side of the arm, which revolves with the shaft in counterclockwise direction. As best shown in Fig. 3 the feeder arms 39 extend immediately between the pallet rest arms 15 which in their counterclockwise advance or closing movement intersect the plane determined by the pair of moving arms 39.

The shaft 23 has a sprocket wheel 50 thereon driven through a sprocket chain 51 from a driving shaft 52' provided with a sprocket wheel 52. The parts are so related to each other that the feeder arms 39 make a half turn, while chain 25 advances through the distance between successive lugs 37. The pallet feeder arms 39 are in such phase relation with the lugs 37 on the chains that the then outer arm 39' thereof is about to descend from horizontal, as the trailing edge of a pallet passes over the sprocket wheel 24. In actual practice it will be understood that sprocket wheels 29 and 52 would be mounted on one and the same driving shaft, but they are separately shown to avoid confusion.

While the pallet setter and inverter may be combined with a wide variety of brick dumping installations, I prefer to combine it with the specific dumper shown in my copending application, Serial No. 177,897, filed March 24, 1927.

It is briefly noted that this dumper embodies two pairs of endless conveyor chains, the outer pair 42 serving to carry the successive molds 43 and the inner pair 44 serving to carry the pallets 45 with the superposed soft bricks 46. There is a slight inclination, as shown, between the two sets of chains which are advanced at equal rate, so that a slow separation takes place between the pallets and the molds, as the chains travel forward, until at the end of the conveyor 44, the molds have completely separated from the bricks on the pallet. The pallets with the soft brick thereon proceed down a gravity chute 47 into the heating chamber (not shown) while the molds are projected down a chute 48 along the gravity roller conveyor 49 to the sander (not shown) for subsequent return to the brick molding machine.

In my construction the pallet rest arms 15 are in planes respectively between the pallet carrying chains 44 and the mold carrying chains 42 of the dumper. Thus, it will be seen that as the pallet rest arms with the pallets and molds thereon are returned to the outer or open position shown in Figs. 1 and 6 the pallet will be deposited on the pallet chains and the mold on the mold chains of the dumper, whereupon the arms 15 move slightly below the respective chains. Before the arms 15 again advance to closing position of the inverter, the dumper chains will have progressed by considerably more than the length of arms 15, so that arms 15 can pivot upward without clashing with or upsetting the previously delivered loaded pallet.

In operation of the pallet setter, all that is needed is for a boy to successively lay or drop pallets upon the platform 36 against stop 35. As the chains 25 advance, a pair of lugs 37 reach the edge of the pallets and thereupon push the same forward. As the trailing edge of the pallet reaches the sprocket wheels 24, the feeder arms 39 are approximately horizontal, so that in the continued advance of lugs 37 the pallet will be pushed onto and will slide by gravity down the now downwardly inclined arm 39' until it reaches the stop fingers 41 at the lower end thereof. The chain 25 and arms 39 are so timed relative to the inverter 11 that the pallet feeder arms 39 revolve past the pallet rest 15, as the latter approaches vertical position in its clockwise or closing rocking advance. Thus, the pallet rest arms 15 pick the pallet off the arms 39, the lower edge of the pallet being supported on shoulders 18. The pallet is thus caused to rest on the pallet arms 15 in the same manner as if it had been there positioned by hand and the operation of the inverter proceeds in the well-understood manner previously set forth.

Thus, the simple operation of manually positioning the pallet at a readily accessible place, to reach which the attendant need not even stoop, the pallet is advanced by the moving conveyor chain to the feeder arms, down which it slides as in a chute, from which the pallet is picked up by the pallet arms of the inverter in their movement past the rotating feeder arms before either of said arms has reached vertical position. Accordingly, there is no danger of the pallet tipping over or falling off in the course of shifting from one to the other pair of arms.

With the parts positioned as stated, it will be apparent, that in the continued rotation of the pallet feeder arms, the latter will have moved out of the path of the return or opening stroke of the pallet rest arms 15.

The pallet setter has no delicate trip latches and no locks of any kind, and is devoid of carriages or cradles subjected to compound movement and is thus not apt to become out of order. The mechanism is of utmost simplicity and maintains the correct timing and relation of its parts throughout operation, without the need for repeated adjustments.

While my pallet setter is preferably employed in combination with the inverter and with the preferred dumper disclosed, it will be understood that the principle thereof may be applicable to other types of inverters and dumpers.

It will thus be seen that there is herein described apparatus in which the several features of this invention are embodied, and which apparatus in its action attains the various objects of the invention and is well suited to meet the requirements of practical use.

As many changes could be made in the above construction, and many apparently widely different embodiments of this invention could be made without departing from the scope thereof, it is intended that all matter contained in the above description or shown in the accompanying drawings, shall be interpreted as illustrative and not in a limiting sense.

Having thus described my invention, what I claim as new and desire to secure by Letters Patent of the United States is:—

1. In a brick making machine of the type including an inverter, having correlated pallet and mold rests and transmission means for relatively moving said rests; the combination of automatic pallet setting means comprising a pallet feeder, said pallet rest being co-ordinated with said feeder to move past the latter in its approach toward the mold rest, thereby to engage and to pick up the pallet.

2. In a brick making machine of the type including an inverter having correlated pallet and mold rests and transmission means for relatively moving said rests; the combination therewith of automatic pallet setting means comprising a pallet conveyor chain and a feeder to which the chain conveyor delivers, said pallet rest being coordinated with said feeder to move past the latter in its approach toward the mold rest, thereby to engage and pick up the pallet from the feeder.

3. In a brick making machine of the type including an inverter, having correlated pallet and mold rests and transmission means for relatively moving said rests; the combination therewith of automatic pallet setting means comprising a pallet conveyor chain, a feeder upon which the pallet is moved from off the end of the chain conveyor, said pallet rest being co-ordinated with said feeder to engage and to pick up the pallet therefrom in the movement of approach of said rest relative to the mold rest, and transmission means for moving the feeder out of the path of return movement of the pallet rest.

4. In a brick making machine of the type including an inverter having correlated pallet and mold rests and transmission means for relatively moving said rests; the combination therewith of automatic pallet setting means comprising a pallet conveyor chain, driving means therefor, a feeder moved to operative position by said driving means and at the outlet end of said chain conveyor, upon which the pallet is delivered from off the end of the conveyor chain, said pallet rest being coordinated with the feeder to engage and to pick up the pallet therefrom in the movement of approach of said rest relative to the mold rest, said feeder being movable out of obstructing relationship with respect to the loaded pallet rest in the return or opening movement of the latter.

5. In a brick making machine of the type including an inverter having correlated pallet and mold rest arms and inter-geared rock shafts for relatively moving said arms; the combination therewith of automatic pallet setting means comprising a pallet conveyor chain, a chute at the delivery end of said chain conveyor to the end of which the pallet is slid from off the end of said conveyor, the rock shaft of said pallet rest being substantially below said chute and being co-ordinated with said chute for the rest arms to engage and to pick up the pallet from the chute in the movement of approach of said rest relative to the mold rest, and means whereby the chute is moved out of obstructing relationship with respect to the return travel of the loaded pallet rest.

6. In a brick making machine of the type including an inverter having correlated pallet and mold rests and transmission means for relatively moving said rests; the combination therewith of automatic pallet setting means comprising a pallet conveyor chain, driving means therefor, a chute at the delivery end of said chain conveyor, moved to operative inclined position by said driving means, along which the pallet is slid from off the end of said conveyor, the rock shaft of said pallet rest being substantially below said chute and being co-ordinated with said chute to engage and to pick up the pallet therefrom in the movement of approach of said rest relative to the mold rest, and means whereby the chute is moved out of obstructing relationship with respect to the return travel of the loaded pallet rest.

7. In a brick making machine of the type which includes an inverter having inter-geared pallet rest arms and mold rest arms; the combination therewith of a pallet setter comprising a horizontal conveyor on which the pallet is placed, a pallet feeder support having a horizontal pivoting axis, said support correlated with said conveyor to serve as a chute down which the pallet slides from off the end of the conveyor, said support having stop means for limiting the slide of the pallet, said support extending substantially contiguous to, but clear of the path of movement of the pallet rest arms, and disposing the pallet in the path of the pallet rest arms, whereby the pallet will be picked off the support in the movement of the pallet rest arms, said support being so correlated with said rest arms that it has moved to inobtrusive position prior to the return of the rest arms.

8. In a brick making machine, the combination of an inverter including oscillating pallet rest arms, rotating pallet feeder arms having stop ends, the length of said rest arms in their movement toward the mold, intersecting the cylindrical locus connecting the paths of said feeder arms, and a horizontal conveyor timed with said rotating arms, to automatically slide a pallet thereonto as said feeder arms reach downward inclination, said rest arms and said feeder arms being so timed that the former will lift the pallet from the latter in the course of its operation.

9. In a brick making machine, the combination of an oscillating inverter, including pallet rest arms, pallet setting means therefor comprising a horizontal chain, means for continuously advancing said chain, pallet feeding arms revolving about a horizontal axis in timed relation with said chain, said feeding arms having stops extending adjacent to and between the rest arms in the course of movement of the latter, the parts being timed so that in the forward stroke of the rest arms, the pallet will be automatically picked up from the pallet feeder arms.

10. In a brick making machine, the combination of an inverter, including co-acting oscillating mold rest arms and pallet rest arms, means for oscillating said arms in timed relation, pallet setting means including a horizontal conveyor chain at level higher than said pallet rest arms and a gravity chute near the end of said conveyor, the conveyor and the chute being correlated to bring the chute into the path of movement of the pallet rest arms during the pallet feeding stroke of the latter and to remove said chute out of the path of return of said rest arms.

11. The combination set forth in claim 10 in which the gravity chute comprises a pair of parallel arms rotating with a shaft at the driven end of the conveyor, the sprocket wheels for the outlet end of the conveyor being idlers upon said shaft.

12. In a brick making machine, the combination of pallet conveying chains, sprocket wheels driving the same, said chains having spacing stops thereon for conveying pallets at definite intervals, feeder arms mounted at the delivery end of the conveyor, said arms so correlated with the stops on the chains as to be inclined downward when a chain stop has advanced a pallet to the corresponding sprocket wheel, so that the pallet slides down the arms, and an inverter including oscillating pallet rest arms correlated with the feeder arms to pick up the pallet therefrom in the operating movement of the inverter.

13. In a brick making machine, an inverter having a pallet rest, a rock shaft for oscillating said rest, a pallet feeder, a shaft mounting said feeder for rotary movement, said feeder being of length less than the distance between said shafts, thereby clearing the rock shaft in its movement, said feeder presenting the protruding ends of the pallet for engagement by the pallet rest in its closing rocking movement.

14. In a brick making machine, the combination of an inverter including a pair of parallel rocking pallet rest arms, a pallet conveyor chain, and a chute device down which the pallet slides, from off said chain, said chute positioning the pallet in the path traversed by the pallet rest in its movement toward closing position, whereby the pallet is automatically picked off the chute in the closing movement of the inverter.

15. In a brick making machine, the combination of an inverter including a rock shaft having pallet rest arms movable therewith, a pallet conveyor chain having driving sprockets at higher level than said inverter, a pallet feeder comprising a pair of parallel double ended arms, at the outlet end of the conveyor, the pallet feeder rotating in the same direction as that in which the rock shaft moves toward inverter closing position, whereby the depending arms of the pallet feeder will move in direction opposed to that of pallet rest arm closure, parts of the pallet on the feeder extending clear thereof directly in the path of the closing movement of the pallet rest arms.

16. In a brick making machine, a pallet conveyor comprising a pair of parallel shafts, sprocket wheels thereon, a pair of endless chains over said sprocket wheels, a pallet platform over said chains, lugs on said chains for entraining a pallet from said platform, the shaft at the delivery end of said conveyor having a pair of parallel pallet feeder arms affixed thereon and revolving therewith, the opposite ends of said arms having stop lugs thereon, said arms so related with the lugs on the chain as to intercept the pallet being pushed off the end of the conveyor, an inverter comprising a pallet rest rock shaft substantially below said chain, and operating means therefor to cause the pallet rest to pick the pallet from off the feeder arms, in the advance of said rest, said parts being so timed that the feeder arms have moved out of the path of return travel of the pallet rest arms.

17. In a brick making machine, a mold dumper comprising a pair of pallet conveyor chains and a pair of mold conveyor chains diverging with respect thereto, an inverter including pallet rest arms, mold rest arms, means for oscillating said arms alternately toward and from each other to shift the mold from the mold arms to a pallet laid on the pallet arms, means for setting the pallet, including a gravity chute extending into the path of the operative stroke of the pallet arms, so that the latter will pick the pallet off the chute, said pallet arms in their return movement depositing the pallet and the superposed mold on the respective chains, said dumper chains being advanced at a rate sufficient for the pallet and the mold to clear the pallet arms, as the latter are returned for receiving the next pallet.

18. In a brick making machine, the combination of an inverter including a rock shaft having a pair of pallet rest arms, a dumper including a pair of mold carrying chains and a pair of pallet carrying chains, said chains diverging with respect to each other, a pallet feeder chute disposing the pallet in the path of closing movement of the inverter, so that the pallet arms will automatically pick the pallet thereoff, means removing the chute out of clashing relation with respect to return or opening movement of the loaded pallet rest arms, said arms extending in the spaces between the respective pairs of dumper chains, so that in the complete opening movement of the arms, the loaded pallet and the mold will be correctly deposited on said chains.

19. In a brick making machine, the combination of an inverter including a rock shaft having a pair of pallet rest arms, a dumper including a pair of mold carrying chains, and a pair of pallet carrying chains, said chains diverging with respect to each other, a pallet feeder chute disposing the pallet in the path of closing movement of the inverter, so that the pallet arms will automatically pick the pallet thereoff, means removing the chute out of clashing relation with respect to return or opening movement of the loaded pallet rest arms, said arms extending in the spaces between the respective pairs of dumper chains, so that in the complete opening movement of the arms, the loaded pallet and the mold will be correctly deposited on said chains, said dumper chains being advanced at rate such as to move the loaded pallet and the mold beyond the pallet rest arms before the latter are again raised above the dumper chains in the next closing movement of the inverter.

20. The method of setting a pallet upon the pallet rests of the mold inverter of a brick machine, which includes the step of sliding the pallet from an accessible part of the machine to the path of movement of the pallet rests, so that the latter in their normal travel, will pick up the pallet.

Signed at Athens in the county of Greene and State of New York this 26 day of July, A. D. 1927.

JOHN B. MAYONE.